3,729,523
                              Patented Apr. 24, 1973

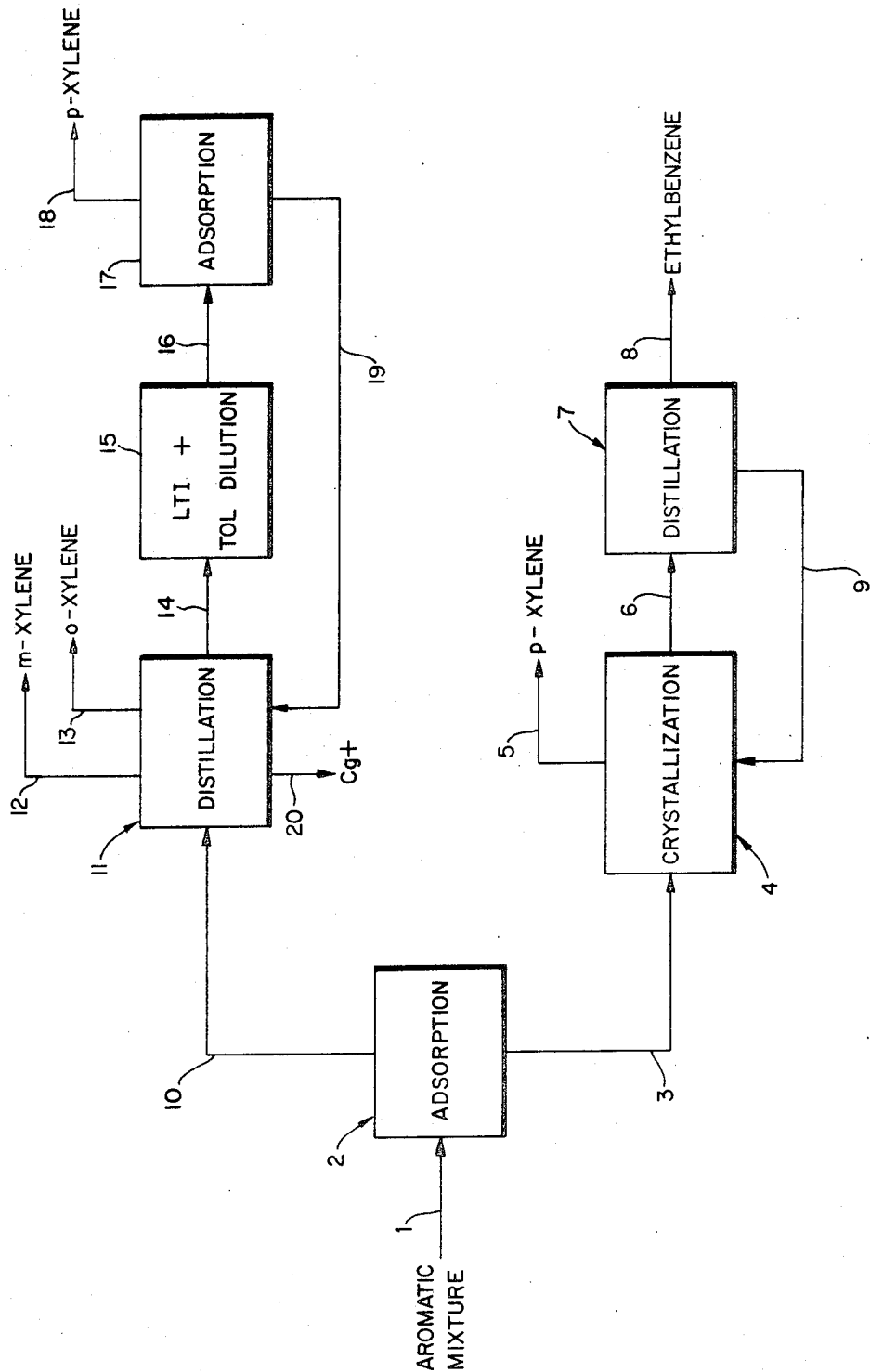

3,729,523
RECOVERY OF ISOMERS FROM AROMATIC MIXTURES
Philip Grandio, Jr., and Paul T. Allen, Beaumont, Tex., assignors to Mobil Oil Corporation
Filed Apr. 14, 1971, Ser. No. 133,929
Int. Cl. C07c 7/02, 15/08
U.S. Cl. 260—674 A                     12 Claims

ABSTRACT OF THE DISCLOSURE

Aromatic mixtures which contain para-xylene, ortho-xylene and meta-xylene and ethylbenzene as well as $C_9$ and higher impurities are separated for recovery of the said components by the steps including subjecting the mixture to adsorption or chromatography to provide (1) a mixture of para-xylene and ethylbenzene, and (2) a mixture of meta-xylene, ortho-xylene and $C_9$ and other components of the mixture, crystallizing the mixture of para-xylene and ethylbenzene under such conditions as to obtain crystals of para-xylene and then distilling the mother liquor to obtain the ethylbenzene. The mixture of meta-xylene, ortho-xylene and other components is distilled in one embodiment to remove all of the meta-xylene and ortho-xylene. In a separate embodiment only portions of the meta- and ortho-xylene are removed by distillation and the latter is subjected to low temperature isomerization with toluene dilution followed by a second adsorption step to provide additional para-xylene. The advantages of the process are that the production of all isomers is feasible and all useful isomers are recovered in high purity.

BACKGROUND OF THE INVENTION

Field of the invention

This invention relates to a process for the separation and recovery of xylene isomers and ethylbenzene from mixtures of the same contained in aromatic mixtures. The invention has particular reference to a process for separating the individual isomers from each other and the recovery of each xylene isomer and ethylbenzene in high purity.

Description of the prior art

The xylenes and especially para-xylene, are very useful materials but are generally found only in admixture with each other. Thus, the xylenes are found in substantial quantities in coke oven light oil and certain virgin and reformed petroleum naphthas. It has formerly been the practice in the separation of xylene isomers either to use chemical methods or to distill para- and meta-xylene, ethylbenzene and some paraffins from a fraction containing the xylene isomers, ethylbenzene and paraffins, thus separating ortho-xylene as a distillation bottoms product in admixture with some of the paraffins and to separate para-xylene from the distillate by fractional crystallization. Many methods have been devised heretofore, however, which do not require a distillation step but these provide for only separation of a single isomer such as para-xylene and in a yield limited to only that amount theoretically obtainable in a single step from the mixtures of xylenes, ethylbenzene and paraffins. More recent developments in this area have included crystallization steps as well as distillation steps for the recovery of the valuable components. These crystalline steps have in some cases been combined with isomerization procedures in order to isomerize other components to the desired para-xylene product.

The primary problem with these processes has been that no single process has been available for the recovery of each of the individual isomers as well as ethylbenzene contained in the mixture in high purity. Often, these processes provide only one or two of the components in good purity and a second substantial process has to be conducted in order to obtain the other isomers. One such process is the so called extraction procedure with $BF_3$—HF as shown in the art. However, this process cannot produce high purity meta-xylene. A further problem has been in the use of a so called low temperature isomerization step in connection with such processes but in these prior processes, ethylbenzene is not converted to xylene and in such operations, very little of the ethylbenzene is converted which results in buildup of ethylbenzene in the recycle streams. This, therefore, necessitates operation with ethylbenzene in the reactor feed, thereby reducing the process efficiency.

It is, therefore, apparent that a clear need remains in the art for an integral and continuous process by which each of the valuable isomers, para-xylene, meta-xylene, ortho-xylene and ethylbenzene, may be recovered from aromatic mixtures containing the same. It is well known with respect to the recoverable components that para-xylene is an important intermediate for the production of terephthalic acid and ethylbenzene is an important intermediate in the production of styrene by methods well known to the art in those areas.

SUMMARY OF THE INVENTION

It is, accordingly, one object of this invention to provide an integral process which overcomes or otherwise mitigates the problems of the prior art in permitting the recovery of high purity m-xylene.

A further object of the invention is to provide a process for the recovery of all the feasible isomers, para-xylene, meta-xylene, ortho-xylene, and ethylbenzene, from aromatic mixtures containing the same.

A still further object of the invention is to provide an integral and continuous process for the recovery of individual xylene isomers and ethylbenzene from aromatic mixtures containing the same utilizing adsorption, crystallization and isomerization procedures in an integral manner to provide high purity products.

Further objects and advantages of the present invention will become apparent as the description thereof proceeds.

In satisfaction of the foregoing objects and advantages, there is provided by this invention a process for the recovery and isolation and separation of para-xylene, ortho-xylene, meta-xylene and ethylbenzene from aromatic mixtures containing the same which process includes the steps of:

(1) subjecting the aromatic mixture to adsorption to provide:
  (a) a mixture of para-xylene and ethylbenzene and,
  (b) a mixture of meta-xylene and ortho-xylene with the other components of the mixture, such as $C_{9+}$;
(2) subjecting the mixture of para-xylene and ethylbenzene to controlled crystallization to recover para-xylene and distilling the resulting mother liquor to provide the ethylbenzene;
(3) distilling the mixture of meta-xylene, ortho-xylene and the other components to recover all the meta-xylene and ortho-xylene individually; or in an alternative embodiment:
  (a) distilling only a portion of the meta-xylene and ortho-xylene in the distillation step;
  (b) subjecting the resulting mixture to low temperature isomerization with toluene dilution and then subjecting to an adsorption step to provide additional para-xylene and removing the para-xylene from the system.

BRIEF DESCRIPTION OF THE DRAWING

Reference is now made to the drawing accompanying the present invention wherein there is shown a schematic diagram of a process for practicing the invention.

DESCRIPTION OF THE PREFERRED EMBODIMENT

As indicated above, the process of the present invention provides a number of advantages over existing isomer separation processes. Thus production and separation of all the isomers in high purity is obtained; crystallizer throughput is increased as well as per-pass p-xylene recovery; and the ethylbenzene column size can be reduced. Also, toluene dilution of m- and o-xylene streams to the low temperature isomerization can be used when the m- and o-xylene feed is ethylbenzene-free, whereby 100% efficiency is achieved. Further, the adsorption unit does not have to produce a m- and o-xylene-free p-xylene and/or ethylbenzene stream to provide improvements in throughput.

In practicing the process, it has been found that process efficiencies of 100% are realized in both para-xylene and ortho-xylene production. In addition, the removal of meta-xylene from the para-xylene/ethylbenzene stream permits high recovery of para-xylene by crystallization and the filtrate, having a higher ethylbenzene content, enables ethylbenzene recovery by distillation using smaller distillation apparatus, that is, less trays in the column.

An aromatic mixture preferably employed as a starting feed material in the process of the present invention generally comprises ethylbenzene, para-xylene, meta-xylene, ortho-xylene and a crude mixture of $C_9$ paraffins and higher carbon chain materials. Generally, a preferred mixture will have the following proportion of components present.

| Component: | Amount (weight percent) |
|---|---|
| Ethylbenzene | 0–15 |
| Para-xylene | 20–30 |
| Meta-xylene | 40–50 |
| Ortho-xylene | 15–25 |
| $C_9$ and higher paraffins | 0–25 |

According to the process of the present invention, there are provided procedures by which this mixture can be separated into its component parts with high process efficiency and the recovery of high purity components. A special feature of the invention includes an isomerization step to maximize para-xylene recovery.

In the initial step, a mixture of the above type is subjected to an adsorption step to recover a first mixture of para-xylene and ethylbenzene and a second mixture comprising meta-xylene, ortho-xylene and the $C_9$ and higher paraffins. While any conventional adsorption procedure can be used, it is preferred to conduct the adsorption step in the presence of a molecular sieve or synthetic crystalline aluminosilicate zeolite as the adsorbent. Zeolites of the type which may be used in the adsorption step include any of the natural and synthetic zeolites which will effect the desired separation. It is preferred to use the zeolite, ZSM-5, which is fully described and claimed in copending application Ser. No. 882,692, filed Dec. 5, 1969, of J. Cattanach, of the same assignee; accordingly, the disclosure of the copending application is hereby expressly incorporated herein by reference. The ZSM-5 adsorbent has the unique property of adsorbing p-xylene and ethylbenzene while o-xylene, m-xylene and $C_9$ and higher aromatics do not enter the pore structure and are not adsorbed. Conventional adsorption beds can be used.

In conducting the adsorption process the aromatic mixture is heated to the desired temperature (e.g. 50° F.–600° F., preferably about 75° F.–450° F.) and passed through a vessel containing the adsorbing material or over a porous bed of the same in a conventional manner. In the process, the p-xylene and ethylbenzene, the only materials adsorbed, may then be recovered from the adsorptive by any of several alternative procedures. Thus, heating the adsorbent, reducing the partial pressure of the sorbed material in the vapor or liquid surrounding the adsorbent, lowering the total pressure of the system or purging with a suitable inert gas or displacement liquid, effect suitable desorption of the mixtures. As a result of using any of these desorption techniques, there is recovered a mixture of para-xylene and ethylbenzene. The remainder of the mixture, i.e. a mixture of the remainder of the starting material comprising meta-xylene, ortho-xylene and any $C_9$ and higher carbon aromatics or other components, is not adsorbed.

The resulting para-xylene and ethylbenzene mixture is then subjected to crystallization which is preferably conducted in several crystallization stages and usually includes inducing the crystallization by seeding. Thus, crystallization is conducted by passing the mixture into a crystallizer maintained at a temperature sufficient to induce crystallization of para-xylene (e.g. cooling to between 0° and —80° F.) removing the mixture from the crystallizer, separating the para-xylene and passing to the second stage for further cooling and the recovery of additional para-xylene. The resulting mother liquor, after removal of para-xylene, is then passed to a distillation stage where the mixture is distilled by known methods to recover the ethylbenzene as the primary component. In this step, staged crystallization, such as by use of a series of crystallizers, has been found to provide optimum results. Preferably, in a continuous process the bottoms from the distillation are continuously recycled to the crystallization stage for the recovery of additional para-xylene.

Referring now to the unadsorbed mixture from the initial adsorption stage which comprises meta-xylene, ortho-xylene and higher boilers which are primarily $C_9$ and higher aromatics, this mixture is transferred from the adsorption stage to a distillation stage where at this point either of two alternative procedures may be employed. In one procedure this mixture is subjected to fractional distillation by conventional techniques but preferably under vacuum with fractionation to separate meta-xylene and ortho-xylene by their boiling points. The lower boiling meta-xylene is removed first. The $C_9$ and higher aromatics are removed as distillation bottoms and discarded. Thus, in this embodiment, the meta-xylene and ortho-xylene are fractionally distilled to effect the separation by the difference in boiling points.

In a second and more preferred embodiment for treatment of this mixture of components only a portion of the meta-xylene and ortho-xylene is distilled from the mixture, that is, a portion of the mixture, is removed which may range from 1 up to about 90% by weight of the amount of meta-xylene and ortho-xylene contained in the mixture, is not distilled and is allowed to remain in the distillation zone. Thereafter this mixture is transferred to an isomerization stage where, by low temperature isomerization with toluene dilution, at least a portion of these ortho- and meta-xylene isomers is isomerized to produce further para-xylene. Preferably, complete isomerization is achieved. The isomerized mixture is then transferred to a second adsorption or chromatography stage, conducted as described hereinabove for the first step, where additional para-xylene, formed by the isomerization, is adsorbed over ZSM-5, desorbed and recovered. The remaining unadsorbed mixture, comprising distillation bottoms, is then recycled to the distillation stage for treatment by either of the two embodiments. This latter embodiment represents a most preferred aspect of the process of the invention.

The low temperature isomerization stage with toluene dilution may be carried out in any desired manner but is preferably conducted employing about 5 to 30% by weight, preferably 15 to 25% by weight, of added toluene, based on the amount of material charged to the isomerization stage, as a diluent to increase selectivity in the isomerization of the meta-xylene and ortho-xylene and the formation of para-xylene. This isomerization reaction may be carried out over any desired catalyst but is preferably carried out in the presence of a crystalline aluminosilicate catalyst which has a pore size of greater than 5 angstrom units such as zeolites X, Y, mordenite, and ZSM-4. Because members of the family of zeolites designated as ZSM-4 possess extraordinary selectivity, such materials are especially preferred. These ZSM-4 catalysts are more fully described hereinafter.

The low temperature isomerization may be carried out at temperatures between about 250° F. and 1000° F. and at pressures ranging from ambient pressures or less up to about 2000 p.s.i.g. In general, the isomerization reaction is preferably carried out at temperatures ranging from about 350° F. to 650° F. Within these limits the conditions of temperature and pressure may vary considerably depending upon equilibrium considerations and reaction conditions. Quite obviously optimum conditions are those in which maximum yields of desired isomer products are obtained and hence considerations of temperature and pressure may vary within a range of conversion levels designed to provide the highest selectivity and maximum yield. However, in a preferred operation using the ZSM-4 catalyst, it has been found that controlled isomerizations can be effectively achieved at temperatures below about 600° F. and a liquid phase operation using sufficient pressure to maintain the material in a liquid phase. The liquid phase operation is especially advantageous since high levels of activity and selectivity can be maintained for an extended period of time. No xylene conversion to ethylbenzene occurs in the low temperature isomerization procedure.

The isomerization reaction can be carried out over a wide range of liquid hourly space velocities (LHSV) within the range of 0.05 to 40. In a preferred operation the space velocity is within the range of 0.25 to 10 since the conversion generally decreases with an increase in space velocity although selectivity is usually increased.

After the isomerization reaction is completed as pointed out above, the entire mixture is passed to a second adsorption stage where, in the presence of adsorbents as illustrated above in connection with the first step, the para-xylene formed in the isomerization stage is removed from the system. Since the stream is ethylbenzene-free, the p-xylene can be easily removed. This is made especially easy with the low temperature isomerization. After removal of the para-xylene, the resulting mixture may be recycled to the distillation stage for removal of all the meta- and ortho-xylene or recycled to the isomerization for removal of a portion thereof with recycle to the isomerization stage for formation of further para-xylene.

The crystalline zeolites used in the isomerization and designated as "Zeolite ZSM-4" or simply "ZSM-4" are disclosed and claimed in copending U.S. application Ser. No. 722,149 filed Apr. 18, 1968, of the same assignee. They can be identified in terms of mole ratios of oxides as follows:

$$0.9 \pm 0.2 M_{2/n}O : W_2O_3 : 3-20YO_2 : zH_2O$$

wherein M is a cation, $n$ is the valence of said cation, W is selected from the group consisting of aluminum and gallium, Y is selected from the group consisting of silicon and germanium, and $z$ is from 0 to 20. In the as synthesized form the zeolite has a formula, in terms of mole ratios of oxides as follows:

$$0.9 \pm 0.2 M_{2/n} : Al_2O_3 : 3-20SiO_2 : zH_2O$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

$$0.9 \pm 0.2 [xR_2O + (1-x)M_{2/n}O] : W_2O_3 : 3-20YO_2 : 0-20H_2O$$

where W and Y have the previously assigned significance, R is tetramethylammonium, M is an alkali metal cation and $x$ is between 0.01 and 0.50.

The original cations can be replaced, at least in part, by ion exchange with another cation. Preferably, the other cation is selected from the group consisting of alkylammonium, e.g. tetramethylammonium, arylammonium, metals, ammonium, hydrogen, thermally treated products of ammonuim and/or hydrogen, or combinations of any of these cations. Particularly, preferred cations include hydrogen, rare earth metals, aluminum, metals of Groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700° F. In a preferred embodiment of ZSM-4, W is aluminum, Y is silicon and the silica/alumina mole ratio is at least 5 and ranges up to about 15.

Members of the family of ZSM-4 zeolites possess a definite distinguishing crystalline structure whose X-ray diffraction pattern has the following values:

TABLE 1

| Interplanar spacing $d$(A.) | Relative intensity |
|---|---|
| 9.1±.2 | v.s. |
| 7.94±.1 | m.w. |
| 6.90±.1 | m. |
| 5.97±.07 | s. |
| 5.50±.05 | m.w. |
| 5.27±.05 | m.w. |
| 4.71±.05 | m.w. |
| 4.39±.05 | w. |
| 3.96±.05 | w. |
| 3.80±.05 | s. |
| 3.71±.05 | m. |
| 3.63±.05 | m. |
| 3.52±.05 | s. |
| 3.44±.05 | m. |
| 3.16±.05 | s. |
| 3.09±.05 | m. |
| 3.04±.05 | m. |
| 2.98±.05 | m. |
| 2.92±.05 | s. |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_0$, where $I_0$ is the intensity of the strongest line or peak, and $d$ (obs.), the interplanar spacing in A., corresponding to the recorded lines, were calculated. In Table 1 the relative intensities are given in terms of the symbols s.=strong, m.=medium, ms.=medium strong, m.w.=medium weak and v.s.=very strong. It should be understood that this X-ray diffraction pattern is characteristic of all the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray powder diffraction patterns of several of these forms are set forth below. The ZSM-4 forms set forth below are all aluminosilicates.

| NaTMAZSM-4 | | NaTMAZSM-4 | | HZSM-4 | | ZnNaTMAZSM-4 | | RENaZSM-4 | | CaNaTMAZSM-4 | | MgNaTMAZSM-4 | |
|---|---|---|---|---|---|---|---|---|---|---|---|---|---|
| d (A.) | I/I₀ | d (A.) | I/I₀ | d (A.) | I/I₀ | d (A.) | I/I₀ | d (A.) | I/I₀ | d (A.) | I/I₀ | d (A.) | I/I₀ |
| 17.5 | 2 | 17.6 | 5 | | | | | | | 17.5 | 8 | | |
| 16.0 | 17 | 16.1 | 20 | 15.8 | 12 | 16.1 | 6 | | | 15.8 | 38 | 16.1 | 17 |
| 9.18 | 100 | 9.19 | 100 | 9.12 | 100 | 9.21 | 79 | 9.12 | 87 | 9.10 | 100 | 9.07 | 100 |
| 7.96 | 21 | 7.96 | 20 | 7.88 | 49 | 7.97 | 40 | 7.93 | 8 | 7.90 | 11 | 7.93 | 28 |
| | | 7.34 | 3 | | | | | 6.89 | 42 | 6.88 | 43 | 6.89 | 36 |
| 6.94 | 12 | 6.93 | 30 | 6.85 | 24 | 6.92 | 36 | 5.97 | 71 | 5.96 | 55 | 5.98 | 64 |
| 6.01 | 34 | 6.01 | 33 | 5.95 | 62 | 6.01 | 60 | 5.49 | 5 | 5.49 | 13 | 5.50 | 7 |
| 5.53 | 4 | 5.53 | 7 | 5.47 | 10 | 5.53 | 6 | 5.27 | 10 | 5.26 | 10 | 5.29 | 17 |
| 5.29 | 8 | 5.29 | 7 | 5.25 | 10 | 5.29 | 15 | 4.79 | 8 | 4.92 | 3 | | |
| 4.73 | 30 | 4.72 | 31 | 4.69 | 19 | 4.73 | 51 | 4.70 | 37 | 4.70 | 18 | 4.73 | 48 |
| | | | | 4.54 | 7 | | | | | 4.61 | 5 | | |
| 4.41 | 4 | 4.39 | 4 | 4.37 | 23 | 4.40 | 9 | 4.38 | 16 | 4.37 | 15 | 4.41 | 10 |
| 4.12 | 5 | 4.19 | 1 | | | | | | | 4.11 | 5 | | |
| 3.97 | 13 | 3.95 | 11 | 3.94 | 20 | 3.97 | 18 | 3.94 | 10 | 3.95 | 13 | 3.96 | 12 |
| 3.82 | 67 | 3.81 | 69 | 3.78 | 52 | 3.82 | 100 | 3.79 | 100 | 3.80 | 63 | 3.81 | 95 |
| 3.74 | 11 | 3.72 | 28 | 3.69 | 14 | 3.72 | 36 | 3.71 | 32 | 3.71 | 18 | 3.72 | 36 |
| 3.64 | 31 | 3.63 | 26 | 3.61 | 13 | 3.64 | 24 | 3.62 | 24 | 3.62 | 25 | 3.64 | 26 |
| 3.54 | 30 | 3.53 | 54 | 3.50 | 28 | 3.53 | 72 | 3.52 | 82 | 3.52 | 55 | 3.53 | 86 |
| 3.46 | 7 | 3.45 | 14 | 3.42 | 12 | 3.45 | 15 | 3.44 | 20 | 3.44 | 15 | 3.45 | 24 |
| 3.28 | 4 | 3.28 | 5 | | | | | | | | | 3.28 | 5 |
| 3.17 | 73 | 3.16 | 48 | 3.15 | 43 | 3.17 | 60 | 3.15 | 58 | 3.15 | 55 | 3.16 | 67 |
| 3.10 | 12 | 3.10 | 23 | 3.07 | 14 | 3.10 | 27 | 3.08 | 26 | 3.09 | 25 | 3.10 | 33 |
| 3.05 | 25 | 3.04 | 21 | 3.03 | 20 | 3.05 | 27 | 3.03 | 24 | 3.04 | 20 | 3.05 | 28 |
| 2.99 | 14 | 2.99 | 13 | 2.97 | 10 | 3.00 | 18 | 2.98 | 14 | 2.98 | 23 | 3.00 | 21 |
| 2.93 | 43 | 2.92 | 48 | 2.91 | 29 | | | 2.92 | 66 | 2.92 | 63 | 2.92 | 74 |
| 2.83 | 4 | 2.83 | | 2.81 | 1 | | | 2.83 | 4 | 2.83 | 4 | 2.84 | 3 |
| 2.775 | 1 | | | 2.77 | 1 | | | 2.65 | 7 | 2.65 | 14 | 2.66 | 10 |
| 2.67 | 3 | 2.67 | 2 | | | 2.66 | 9 | 2.63 | 10 | 2.625 | 9 | 2.63 | 9 |
| 2.65 | 6 | 2.65 | 3 | 2.64 | 7 | 2.64 | 8 | | | 2.55 | 2 | 2.56 | 3 |
| 2.63 | 5 | 2.63 | 3 | 2.61 | 3 | 2.57 | 2 | 2.53 | 11 | 2.52 | 8 | 2.53 | 9 |
| 2.56 | 1 | 2.55 | 2 | 2.55 | 1 | 2.53 | 8 | 2.49 | 4 | 2.48 | 3 | 2.49 | 4 |
| 2.52 | 6 | 2.52 | 3 | 2.52 | 5 | 2.51 | 2 | 2.43 | 2 | 2.43 | 2 | 2.43 | 3 |
| 2.49 | 4 | 2.48 | 2 | 2.49 | 2 | 2.48 | 1 | | | 2.40 | 2 | 2.40 | 4 |
| 2.43 | 1 | 2.41 | 1 | 2.42 | 1 | 2.42 | 2 | 2.38 | 10 | 2.375 | 6 | 2.38 | 7 |
| 2.40 | 3 | 2.395 | 2 | 2.39 | 1 | 2.39 | 6 | 2.27 | 10 | 2.275 | 10 | 2.29 | 7 |
| 2.38 | 5 | 2.37 | 2 | 2.36 | 2 | 2.35 | 1 | | | | | 2.27 | 3 |
| 2.34 | 1 | 2.30 | 1 | | | 2.29 | 4 | 2.20 | 3 | 2.20 | 1 | 2.205 | 4 |
| 2.28 | 7 | 2.27 | 2 | 2.27 | 3 | 2.265 | 2 | | | 2.16 | 2 | 2.17 | 5 |
| 2.19 | 2 | | | 2.18 | 2 | 2.17 | 4 | | | 2.14 | 4 | 2.14 | 7 |
| 2.17 | 1 | | | 2.15 | 2 | 2.145 | 3 | 2.10 | 4 | 2.10 | 3 | 2.11 | 5 |
| 2.14 | 3 | 2.14 | 2 | 2.125 | 3 | 2.115 | 3 | | | 2.08 | 1 | 2.09 | 3 |
| 2.10 | 4 | 2.10 | 2 | 2.10 | 3 | 2.10 | 2 | | | 2.03 | 1 | 2.04 | 5 |
| 2.09 | 2 | 2.08 | 1 | 2.07 | 1 | 2.06 | 3 | | | 2.015 | 2 | 2.02 | 1 |
| 2.04 | 1 | 2.03 | 1 | 2.02 | 2 | 2.015 | 1 | 1.98 | 6 | 1.985 | 6 | 1.99 | 9 |
| 2.02 | 3 | 2.015 | 1 | 2.01 | 2 | 2.00 | 2 | | | | | | |
| 1.99 | 6 | 1.98 | 4 | 1.98 | 3 | 1.97 | 3 | | | | | | |

The zeolite may be employed alone or composited with another material such as a naturally occurring clay. Naturally occurring clays which can be composited with the ZSM-4 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clay suitable for use is to treat them with sodium or potassium hydroxide, and calcine at temperatures ranging from 230° F. to 1600° F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline zeolite ZSM-4 and inorganic oxide gel matrix vary widely with the zeolite content ranging from about 1 to about 90 percent by weight and more usually, particularly when the composite is prepared in the form of beads, in the range of about 2 to about 50 percent by weight of the composite.

Referring now to the drawing which illustrates the process including aspects for practice in a continuous manner, it will be seen that a schematic outline is illustrated for each of the embodiments of the invention. As shown in the drawing the aromatic mixture employed as the feedstock is introduced through line 1 into the adsorption stage 2 wherein the first separation is effected. In this separation the para-xylene and ethylbenzene mixture desorbed is removed through line 3 and sent to crystallization stage 4 where, by cooling and seeding, para-xylene crystals are formed and removed through line 5 as by filtration, decantation, etc. The resulting mixture is then removed from the crystallization stage by line 6 and passed to the distillation column 7 where ethylbenzene is removed by a fractional distillation. The bottoms from the distillation stage may then be removed or continuously recycled through line 9 to the crystallization stage for the recovery of further para-xylene by cooling and seeding. Recovery of additional para-xylene is made possible by the fact that most of the ethylenebenzene has now been removed from the system.

Referring back to the adsorption stage 2, it will be seen that the mixture removed through line 10 which contains meta-xylene, ortho-xylene and the remaining components of the mixture, is sent to distillation zone 11 at which point either of the two alternative embodiments may be practiced. In one embodiment all of the meta-xylene and ortho-xylene are removed through lines 12 and 13 respectively by fractional distillation to effect separation by the known differences in boiling points. The distillation bottoms containing primarily C₉ and higher aromatics is removed from the system by line 20 as discard.

In a second embodiment only a portion of the meta-xylene and ortho-xylene are removed in the distillation stage, that is about 1 to 90 weight percent, and the remainder of the mixture is passed by line 14 to the isomerization stage 15 where low temperature isomerization with toluene dilution is carried out in order to form additional para-xylene, the most preferred product. On conclusion of the isomerization stage the mixture is passed through line 16 to a second adsorption stage 17, which may be identical to adsorption stage 2, where additional para-xylene is recovered through line 18. After removal of the para-xylene, the remaining components are recycled by line 19 for further distillation in the distillation stage with further isomerization for the formation of additional para-xylene.

The following example is presented to illustrate the process of the invention but it is not to be considered as limited thereto. Unless otherwise indicated, parts are by weight.

EXAMPLE

The aromatic mixture employed as the feedstock in this example was 100 grams of a mixture containing 12 weight percent ethylbenzene, 25 weight percent para-xylene, 45 weight percent meta-xylene, 15 weight percent ortho-xylene and 3 weight percent of $C_9$ and higher paraffins. This mixture was initially heated to 150° F. and then passed through a vessel containing ZSM-5 zeolite as the adsorbent. Thereafter a stream of nitrogen was passed over the mixture at 175° F. which served to desorb a mixture of para-xylene and ethylbenzene, which mixture was then passed to a crystallization stage operated at a temperature of −50° F. with seeding by fresh para-xylene. Cooling of this mixture at −50° F. for 5 hours resulted in the formation of solid para-xylene which then was removed from the crystallization stage by filtration. From this crystallization stage there was recovered 24 grams of para-xylene.

The remaining mixture in the crystallization stage was then passed to a distillation column for fractional distillation conducted whereby there was recovered 10.5 grams of ethylbenzene. The bottoms from the distillation column were continuously recycled to the crystallization stage for re-use in this portion of the process.

As mentioned, the adsorption step removed the p-xylene and ethylbenzene thereby leaving a mixture containing meta-xylene, ortho-xylene and the remaining components of the mixture. This mixture of components was passed to a fractional distillation stage operated under such conditions that there was first removed 50 weight percent of the theoretical amount of meta-xylene present (or 22.5 grams) and 40% of the theoretical amount of ortho-xylene present (or 7.5 grams). The remaining mixture was then passed to a low temperature isomerization stage in which there was contained ZSM-4 zeolite catalyst. There was additionally added to the vessel 20% by weight of toluene. This vessel was maintained under temperature conditions of 450° F. with catalyst contact being about 2 LHSV. The mixture was then removed and sent to a second adsorption stage which was conducted in the same manner as the first adsorption stage. From this mixture there was recovered an additional 24.5 grams of para-xylene and the remaining mixture was recycled to the distillation stage.

It will thus be seen from the above example that the process of the present invention provides means whereby substantially 100% of the components contained in the aromatic mixture may be recovered therefrom and additionally, the isomerization step maximizes para-xylene recovery.

The invention has been described herein with reference to certain preferred embodiments. However, as obvious variations thereon will become apparent to those skilled in the art, the invention is not to be considered as limited thereto.

What is claimed is:

1. A process for the recovery of the components contained in an aromatic mixture, said components comprising para-xylene, ortho-xylene, meta-xylene and ethylbenzene, which comprises the steps of:
    (a) subjecting said aromatic mixture to a first adsorption stage to provide (1) a mixture of para-xylene and ethylbenzene and (2) a mixture of meta-xylene and ortho-xylene with the other components of the mixture;
    (b) subjecting said mixture of para-xylene and ethylbenzene to crystallization for the recovery of para-xylene;
    (c) subjecting the resulting mother liquor from step (b) to a first distillation stage to provide ethylbenzene by fractional distillation;
    (d) subjecting said mixture of meta-xylene, ortho-xylene and said other components to a second distillation stage with fractionation to recover only a portion of said meta-xylene and ortho-xylene by fractional distillation;
    (e) subjecting the resulting distillation bottoms from said second distillation stage to low temperature isomerization with toluene dilution to form additional para-xylene; and
    (f) subjecting the mixture from step (e) to a second adsorption stage to provide additional para-xylene and removing the para-xylene from the system.

2. A process according to claim 1 wherein, in said first distillation stage for removal of ethylbenzene, the resulting distillation bottoms are recycled to said crystallization stage for the recovery of additional para-xylene.

3. A process according to claim 2 wherein the bottoms from said second adsorption stage are recycled to said second distillation stage for the removal of additional meta-xylene and ortho-xylene.

4. A process according to claim 1 wherein about 1–90% of said meta-xylene and ortho-xylene are removed in said second distillation stage.

5. A process according to claim 1 wherein said first adsorption stage is conducted in the presence of an adsorber at a temperature of about 50° to 400° F.

6. A process according to claim 1 wherein said crystallization step (b) is conducted by cooling said mixture to a temperature of between 0° and −80° F. for several hours.

7. A process according to claim 6 wherein a series of crystallizers are employed.

8. A process according to claim 7 wherein isomerization step (e) is conducted by adding about 5 to 30% by weight of toluene to the mixture.

9. A process according to claim 8 wherein the isomerization is conducted at a temperature of about 250° to 1000° F.

10. A process according to claim 9 wherein the isomerization is conducted over a liquid hourly space velocity of 0.05 to 40.

11. A process according to claim 10 wherein the isomerization is conducted in the presence of catalyst selected from the group consisting of zeolites X, zeolites Y, mordenite, a ZSM-4 zeolite and mixtures thereof.

12. A process according to claim 11 wherein the temperature is 350° to 650° F., the space velocity is 0.25 to 10 and the catalyst is a ZSM-4 zeolite.

References Cited

UNITED STATES PATENTS

| | | | |
|---|---|---|---|
| 3,636,121 | 1/1972 | Stine et al. | 260—674 |
| 3,636,180 | 1/1972 | Broughton | 260—674 |
| 3,114,782 | 12/1963 | Fleck et al. | 260—674 |
| 3,553,276 | 1/1971 | Berger et al. | 260—668 |
| 3,558,730 | 1/1971 | Neuzil | 260—674 |
| 3,578,723 | 5/1971 | Bowes et al. | 260—668 |

DELBERT E. GANTZ, Primary Examiner

C. E. SPRESSER, JR., Assistant Examiner

U.S. Cl. X.R.

208—310; 260—668 A, 674 A